United States Patent [19]

Magnus et al.

[11] Patent Number: 4,722,803
[45] Date of Patent: Feb. 2, 1988

[54] SELF-COMPATIBILIZING POLYESTER POLYOL BLENDS BASED ON DIMETHYL TEREPHTHALATE RESIDUES

[75] Inventors: George Magnus, Arlington Heights; Melvin Loeb, Northbrook; Robert J. Wood, Round Lake Park; Brian Kelley, Round Lake Beach, all of Ill.

[73] Assignee: Stepan Company, Northfield, Ill.

[21] Appl. No.: 792,503

[22] Filed: Oct. 29, 1985

[51] Int. Cl.$^4$ ............................................. C08G 18/42
[52] U.S. Cl. ...................................... 252/182; 560/59; 560/91; 560/92; 528/74.5; 528/77; 528/79; 521/173
[58] Field of Search ............................. 560/91, 92, 59; 252/182; 528/74.5, 77, 79

[56] References Cited

U.S. PATENT DOCUMENTS

| | | | |
|---|---|---|---|
| 2,950,313 | 8/1960 | Kirkpatrick | 560/92 |
| 3,057,892 | 10/1962 | De Groote | 560/91 |
| 3,167,531 | 1/1965 | Parker | 560/92 |
| 4,346,229 | 8/1982 | Derr | 560/91 |
| 4,439,551 | 3/1984 | Yeakey | 560/92 |
| 4,444,918 | 4/1984 | Brennan | 560/92 |
| 4,506,090 | 3/1985 | Brennan | 560/91 |
| 4,568,717 | 2/1986 | Speranza | 252/182 |
| 4,595,711 | 6/1986 | Wood | 252/182 |
| 4,615,822 | 10/1986 | Magnus | 560/91 |
| 4,652,591 | 3/1987 | Londrigan | 560/91 |

Primary Examiner—C. Warren Ivy

[57] ABSTRACT

Fluorocarbon blowing agent compatible polyol blends are provided comprising reaction products of a combination of (a) a residue from the manufacture of dimethyl terephthalate, (b) a low molecular weight diol compound, (c) a nonionic surfactant compound, (d) optionally a hydrophobic compound, and (e) optionally a polybasic carboxylic acid compound. These polyol blends are produced by a simple heating process and are thereafter optionally blendable with various conventional polyols and other additives (including fluorocarbons and catalysts) to make resin prepolymer blends. Such resin blends can be catalytically reacted with organic isocyanates to produce cellular polyurethanes and polyurethane/polyisocyanurates.

29 Claims, No Drawings

SELF-COMPATIBILIZING POLYESTER POLYOL BLENDS BASED ON DIMETHYL TEREPHTHALATE RESIDUES

BACKGROUND OF THE INVENTION

1. Field Of The Invention

This invention lies in the field of polyols useful in formulating resin prepolymer blends for reaction with organic isocyanates to produce polyurethane and/or polyurethanepolyisocyanurate cellular polymers, and, more particularly, in the field of polyester polyols based on dimethyl terephthalate residues which polyols are compatible with high levels of fluorocarbon blowing agents.

2. Prior Art

Aromatic polyester polyols are coming into widespread usage in the manufacture of polyurethane and polyurethanepolyisocyanurate foams. Such polyester polyols are attractive because they tend to be low in cost, yet can produce rigid cellular polymers of excellent properties adapted for many end use applications.

One class of aromatic polyester polyols which has recently become commercially available comprises esters produced by esterifying phthalic acid or phthalic acid anhydride with an aliphatic polyhydric alcohol. For example, a diethylene glycol phthalate is available commercially from Stepan Company, Northfield, Ill. Such liquid product has a desirably low viscosity, a desirably high aromatic ring content, and a desirably low acid number. Even though such product typically has a reactive hydrogen functionality of less than about 3, it catalytically reacts well with organic isocyanates to produce, for example, rigid cellular polyurethane-polyisocyanurate polymers that can have commercially acceptable characteristics.

Another class of aromatic polyester polyols which has recently become commercially available comprises esters produced by reacting polyethylene terephthalate (PET) with alkylene polyols. For example, scrap or waste PET can be digested (glycolized) with a diol or triol as taught by Svoboda et al U.S. Pat. No. 4,048,104, or transesterified with a residue from dibasic acid manufacture as taught by Brennan in U.S. Pat. No. 4,439,550, or the like, to produce a polyester polyol product which catalytically reacts well with organic isocyanates to produce, for example, rigid cellular polyurethane-polyisocyanurate polymers that can have commercially acceptable characteristics.

A further class of aromatic polyester polyols which has recently become commercially available comprises esters produced by reacting dimethyl terephthalate (DMT) residues with alkylene polyols. For example, in DeGuiseppi et al U.S. Pat. No. 4,237,238 a DMT residue obtained from the manufacture of dimethyl terephthalate is transesterified with a glycol of molecular weight ranging from about 60 to 400 and the resulting polyol is reacted with isocyanates to produce polyisocyanurate foams alleged to have a high degree of fire resistance with low smoke evaluation. See also, for examples, Walker U.S. Pat. No. 3,647,759, Grube et al U.S. Pat. No. 4,444,917, Grube et al U.S. Pat. No. 4,444,916, Grube et al U.S. Pat. No. 4,444,915, Anderson U.S. Pat. No. 4,469,821, and Zimmerman U.S. Pat. No. 4,442,238.

One problem with most such commercially viable aromatic polyester polyols is that they characteristically are poorly compatible with fluorocarbon compounds of the type conventionally used as blowing agents to make such cellular polymers.

The usual solution to this problem has been to admix with such a polyol a separately formed compatibilizing agent in an amount sufficient to produce a resulting mixture with a desired amount of compatibility (solubility) for fluorocarbons. For examples, Koehler et al U.S. Pat. No. 4,246,364 use a class of amide diols, while Wood U.S. Pat. No. 4,529,744 issued July 16, 1985 uses a combination of relatively high molecular weight propoxylate ethoxylate compounds with amine and/or amide diol compounds. The amide diols employed by Wood are similar to those taught by Koehler et al. The propoxylate ethoxylate compounds employed by Wood are, in fact, similar to those employed in practicing the present invention, as hereinbelow described.

The necessity to compound a fluorocarbon compatibilizing agent with aromatic polyester polyol means an extra cost in the formulation of a so-called resin prepolymer blend. Such resin prepolymer blends are conventionally employed in the trade for reaction with organic isocyanates to produce polyurethane and/or polyurethane-polyisocyanurate cellular polymers. Resin prepolymer blends are uniform, homogeneous liquid compositions comprised of polyol, urethane-forming and/or isocyanurate-forming catalyst, fluorocarbon blowing agent, other optional additives, and, in the case of aromatic polyester polyols, a fluorocarbon compatibilizing agent, as is well known to those skilled in the art. A desired quantity of a compatibilizing agent is blended with an aromatic polyester polyol before such fluorocarbon is added, and such a blending step itself adds to the cost of resin prepolymer blend manufacture.

However, the cost of a compatibilizing agent is even more significant. Moreover, the costs of such an agent are escalating. For example, the cost of the cochin oil, which is used as a starting material to make an amide diol as above identified, increased by approximately 60 percent in price in 1984. Unless the cost of producing resin prepolymer blends of aromatic polyester polyols can be controlled and maintained at economically competitive levels, aromatic polyester polyols will not have a commercial place in this field.

There is a need for fluorocarbon compatibilized aromatic polyester polyols which not only are economical to produce, but also are convertible into cellular foams having excellent properties.

Aromatic polyester polyols, especially polyols based on residues from the manufacture of dimethyl terephthalate are producible by transesterification of dimethyl terephthalate residues as referenced above. The idea of somehow modifying the reaction components without substantially increasing costs so as to result in a polyol product that is directly compatible (self-compatibilized) with fluorocarbons is certainly attractive. Not only would this avoid the need for a separate compatibilizing agent admixing step, but also this could avoid the cost of an added compatibilizing agent.

So far as is known, no one has heretofore produced a class of polyester polyol blends based on dimethyl terephthalate residues which is both fluorocarbon self-compatibilizing, and produces polyurethane and polyurethane-polyisocyanurate foam with improved properties. Such a polyester polyol can be formulated into a resin prepolymer blend and then reacted with organic isocyanate to produce cellular polyurethane-polyisocyanurate

BRIEF SUMMARY OF THE INVENTION

This invention relates to a new and surprisingly useful class of polyester polyol blends comprised of reaction products of a starting mixture of (a) dimethyl terephthalate residue, (b) at least one low molecular weight aliphatic diol compound, and (c) at least one nonionic surfactant compound. Preferably at least one hydrophobic compound is also present in the starting mixture. These product blends are characterized by low acid numbers, low viscosity, and low reactive hydroxyl functionality (less than about 3).

The invention also relates to methods for making and using such polyester polyol blends, and further relates to cellular polyurethane and polyurethane/polyisocyanurate foams made therewith.

Optionally, but preferably, a polyester polyol blend of this invention is a reaction product of a starting mixture as above described which mixture additionally contains a dibasic carboxylic acid compound so that such dibasic acid compound becomes reacted into such product polyol blend.

The product polyester polyol blends of this invention are self-compatibilized, and, in addition, have a desirable combination of other characteristics which make them useful precursors for producing cellular polyurethane and/or polyurethane-polyisocyanurates. So far as is known, no prior art polyester polyol blend reaction product based on dimethyl terephthalate residues has had such a surprising combination of self-compatibility with other desirable properties.

The polyester polyol blends of this invention can be regarded as being synergistically enhanced in properties, especially fluorocarbon solubility characteristics, by reason of the presence therein of the above indicated reacted mixture containing both at least one such nonionic surfactant compound particularly and at least one such hydrophobic compound is present.

The polyol blends of this invention display a characteristic improvement in fluorocarbon compatibility (solubility) which is surprisingly better than the fluorocarbon solubility achievable with corresponding blends which contain neither reacted nonionic surfactant (compound(s) or only reacted hydrophobic compound(s).

Also, the polyol blends of this invention provide characteristic improvements in the properties of cellular polyurethane and polyurethane/polyisocyanurate polymers made therefrom by catalytic reaction thereof with polymeric isocyanates in the presence of blowing agent. These cellular polymer properties are surprisingly better than the corresponding properties which are achievable in similar cellular polymers made from corresponding polyol blends which do not contain such reacted nonionic surfactant compounds. Such improved product properties include, for example, tumble friability, compressive strength, burn char, and the like.

The polyester polyol blends of the present invention are readily compoundable generally with prior art polyols, if desired, and also with the various additives conventionally used in the formulation of resin prepolymer blends.

The polyol blends of this invention are prepared by a single step transesterification process which is simple, reliable, and well adapted for practice with conventional chemical processing equipment.

Other and further aims, purposes, features, objects, advantages, utilities, embodiments, and the like will be apparent to those skilled in the art from the teachings of the present specification taken with the appended claims.

DETAILED DESCRIPTION

Polyol Blend Characteristics

The polyester polyol blends of this invention, as indicated, are made by using as one class of starting material low molecular weight aliphatic diols. The present polyol blends differ from the above prior art dimethyl terephthalate residue derived polyester polyols made with aliphatic diols in that, in effect, a portion of the low molecular weight aliphatic diol needed to achieve a desired (theoretical) stoichiometry between such diol and the dimethyl terephthalate residue is replaced by at least one nonionic surfactant compound, and, more preferably, by a mixture of such nonionic surfactant compound with at least one hydrophobic compound during formation of such present blends. Thus, the quantity of aromatic rings present in a nonionic surfactant compound modified polyol blend of this invention is maintainable at a level closely related to that in the corresponding prior art unmodified dimethyl terephthalate residue based ester polyols, but the quantity and nature of the aliphatic radicals present in a product polyester polyol blend of this invention are altered to an extent considered desirable or necessary (the exact amount depending upon user wishes) to achieve a level fluorocarbon compatibilization along with other favorable product polyol properties and favorable cellular foam properties. Thus, in general, product polyester polyol blends of this invention are characterized by a surprising combination of properties, as now explained:

Most importantly, the product polyester polyol blends are surprisingly fluorocarbon compatibilized as produced so that they can be formulated into fluorocarbon compatible resin prepolymer blends with for example little, or preferably no, added (after polyol blend formation) unreacted nonionic surfactant compound in order to produce a desired level of fluorocarbon solubility therein. Such a self-compatibilization is achieved easily and simply by incorporating the characteristically relatively inexpensive nonionic surfactant compound into a starting mixture of dimethyl terephthalate residue, low molecular weight aliphatic diol, and (optionally but preferably) hydrophobic compound, as herein explained.

For another thing, these product polyester polyol blends have relatively low viscosities. Viscosities typically fall in the range from about 200 to 50,000 centipoises measured, for example, at 25° C. with a Brookfield viscometer, such as a Model LVT, as is desirable for many end use applications for polyols being used in the manufacture of polyurethane and/or polyurethane/polyisocyanurate cellular products. If desired, the viscosity of a product polyol blend of the present invention can be increased to some desired extent through incorporation into the starting mixture used for transesterification of a quantity of a polyfunctional (that is, having a functionality higher than 2) carboxylic acid or aliphatic alcohol, as taught herein.

For another thing, these product polyester polyol blends, when converted into polyurethane and/or polyurethanepolyisocyanurate rigid cellular polymers, characteristically produce favorable product properties, including, for examples, compressive strength, tumble friability, and the like.

For another thing, these product polyester polyol blends are surprisingly capable of dissolving thereinto significant quantities of added compatibilizer compounds, especially polyalkoxylated nonionic compounds of relatively high molecular weight, if desired, for example, to heighten fluorocarbon compatibility of a resin blend formed therefrom in combination with various ingredients. No gelation upon subsequent addition of fluorocarbon is observed when the total amount of compatibilizer compound (both reacted and admixed) ranges from 0 to about 30 weight of a total product blend basis. Thus, when, for example, such relatively high molecular weight propoxylate ethoxylate compounds are admixed with preformed prior art dimethyl terephthalate residue based polyester polyols which contain no such reacted nonionic surfactant compound(s) therein, gelation is prone to occur, particularly when fluorocarbon is subsequently added to the mixture.

In a further development of the present invention, there is provided a preferred class of nonionic surfactant compound modified polyester polyol blends which are prepared by incorporating into a starting transesterification reaction mixture, in accordance with this invention, a relatively high molecular weight nonionic surfactant which is a propoxylate ethoxylate compound. Such a propoxylate ethoxylate compound becomes at least partially chemically reacted into the dimethyl terephthalate residue polyester polyol blend being produced during the transesterification. The resulting product polyester polyol blend displays excellent and improved fluorocarbon compatibility characteristics, and cellular polymers produced therefrom display excellent tumble friability characteristics. Also, such a product polyester polyol blend appears to have a lower freezing temperature than corresponding blends produced by merely admixing thereinto after a transesterification (which contains in the starting mixture no such propoxylate ethoxylate compound) an equivalent amount of the same propoxylate ethoxylate compound. Thus, such a product blend of this invention is believed to avoid certain processing problems and storage problems in winter. Further, if desired, additional quantities of such a propoxylate ethoxylate compound can be admixed with such a product polyol blend of this invention after the formative transesterification without adding some additional anti-gelation agent and without causing system gelation upon subsequent addition of fluorocarbon.

The polyester polyol blends of the present invention which contain such reacted and/or unreacted high molecular weight propoxylate ethoxylate compounds characteristically have an unusual and surprising ability to form, when catalytically reacted with organic isocyanates, cellular polyurethane and/or polyurethane-polyisocyanurate foams of not only superior tumble friability, but also superior uniform small sized closed cell structure.

In general, a self-compatibilized polyester polyol blend of this invention comprises the reaction product of a starting mixture which comprises on a 100 weight percent total such mixture basis:
(A) from about 15 to 80 weight percent of dimethyl terephthalate residue,
(B) from about 8 to 80 weight percent of at least one low molecular weight aliphatic diol characterized by the generic formula $$HO-R^1-OH \qquad (1)$$

where: $R^1$ is a divalent radical selected from the group consisting of
(a) alkylene radicals each containing from 2 through 6 carbon atoms, and
(b) radicals of the formula:

$$-(R^3O)_n-R^3- \qquad (2)$$

where: $R^3$ is an alkylene radical containing from 2 through 3 carbon atoms, and n is an integer of from 1 through 3, and
(c) mixtures thereof,
(C) from about 2 to 30 weight percent of at least one nonionic surfactant compound, and
(D) from and including 0 to about 20 weight percent of at least one hydrophobic compound provided that the sum total of both said nonionic surfactant compound and said hydrophobic compound is not greater than about 30 weight percent.

By the term "nonionic surfactant" reference herein is generally made to a compound which contains both a hydrophobic moiety and a hydrophilic moiety and which has no moieties which dissociate in aqueous solution or dispersion into cations or anions.

In the practice of the present invention, such a nonionic surfactant compound is characterized by:
(1) containing from about 10 to 600 carbon atoms per molecule,
(2) containing at least one and not more than four hydroxyl radicals per molecule, and
(3) containing from 4 to about 270 radicals per molecule of the formula $$-(R^3O)-$$

where: $R^3$ is as above defined.

By the term "hydrophobic compound" reference herein is generally made to a compound which contains a substantially nonpolar organic moiety that results in such compound being substantially water insoluble and which contains an active hydrogen group, such as an hydroxyl group or a carboxyl group.

In the practice of the present invention, such a hydrophobic compound is characterized by:
(1) having an equivalent weight of from about 130 to 900,
(2) containing from 8 to about 60 carbon atoms per molecule, and
(3) containing one group per molecule selected from the group consisting of carboxyl and hydroxyl.

In addition, such a starting mixture optionally but preferably contains at least one dibasic carboxylic acid compound in an amount ranging from greater than 0 up to about 60 weight percent (100 weight percent total mixture basis). Such a dibasic carboxylic acid compound is characterized by:
(1) containing from and including 2 to about 35 carbon atoms per molecule,
(2) containing two carboxyl

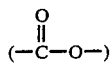

groups per molecule,
(3) containing at least one and no more than two functional groups selected from the class consisting of carboxylic acids, carboxylic acid anhydrides, carboxylic esters, hydroxyl radicals, and mixtures thereof.

When a mixture of hydrophobic compound with nonionic surfactant compound is employed, preferably such mixture is characterized by having a weight ratio of said hydrophobic compound to said nonionic surfactant compound in the range from about 0.1 to 10.

Preparation Conditions

In general, a self-compatibilized polyester polyol blend of this invention is prepared by heating at a temperature ranging from about 180° to 240° C. a starting mixture as above characterized.

Such heating of a starting mixture is continued until a liquid reaction product is produced which is characterized by having:
(A) an hydroxyl number ranging from about 200 to 500,
(B) an acid number ranging from about 0.1 to 7,
(C) a saponification value ranging from about 130 to 400, and
(D) a viscosity ranging from about 200 to 50,000 centipoises measured at 25° C. using a Brookfield viscometer.

The term "hydroxyl number" is defined as the number of milligrams of potassium hydroxide required for the complete neutralization of the hydrolysis product of a fully acetylated derivative prepared from one gram of a polyol or a mixture of polyols.

The term "hydroxyl number" is also defined by the equation:

$$OHV = \frac{56.1 \times 1000 \times F}{M.W.}$$

wherein:
OHV is the hydroxyl number (of the polyol or polyol blend),
F is the average functionality (i.e., the average number of active hydroxyl groups per molecule of the polyol or polyol blend), and
M.W. is the average molecular weight of the polyol or polyol blend.

Similarly, "acid number" is defined by the number of milligrams of potassium hydroxide required to neutralize the acid material present in one gram of sample. The "saponification value" is defined by the number of milligrams of potassium hydroxide required to react with the ester groups present in one gram of sample. To determine saponification value, the American Chemist Society official Method no. C-d-3-25 is preferably employed.

Reaction (heating) time can vary, but typically ranges from about 8 to 16 hours, but longer and shorter reaction times can be used depending upon temperature, starting mixture composition, and like factors, without departing from the spirit and scope of the invention.

Process conditions are summarized in Table I below:

TABLE I

| | Process Conditions* | |
|---|---|---|
| Process Variable | Broad | Presently Preferred |
| 1. Temperature | 180–240° C. | 210–230° C. |
| 2. Pressure | 10 to 760 mm of Hg | autogeneous |

*The reactants are agitated during processing and preferably sparged with an inert gas (e.g. nitrogen) to aid in the removal of water vapor.

Starting Mixture

The composition comprising a starting mixture employed in the practice of this invention (as indicated above) is summarized in Table II below:

TABLE II

| | Starting Mixture* | | | |
|---|---|---|---|---|
| | | Range (100 wt % total basis) | | |
| Item No. | Reactive Component | Broad | Preferred | More Preferred |
| 1 | Dimethyl terephthalate residue | 15–80 | 30–40 | 25–35 |
| 2 | Aliphatic Diol (formula(1)) | 8–80 | 30–65 | 50–60 |
| 3 | Nonionic Surfactant Compound | 2–30 | 5–25 | 10–20 |
| 3a | -high mol. wt. propoxyethoxy compound | 0–30 | 0–10 | 0–0.5 |
| 4 | Hydrophobic compound | 0–20 | 2–12 | 5–10 |
| 5 | Dibasic carboxylic acid | 0–60 | 2–30 | 5–15 |
| 6 | Aliphatic polyol (other) | 0–10 | 0–4 | 0–3 |
| 7 | Aromatic polycarboxylated acid compound (other than dibasic) | 0–10 | 0–8 | 0–5 |
| 8 | Aliphatic polycarboxylated acid compound (other than dibasic) | 0–10 | 0–8 | 0–5 |

Table II footnotes:
*Values herein identified for any given mixture must conform with the composition limits disclosed herein above for a starting mixture of this invention.

A starting mixture always contains the reactive components identified in Table II as items (1) through (3) with components 3a and 4 being optionally but preferably being present. Generally, the sum totoal of all nonionic surfactant compounds plus any optional hydrophobic compounds present in a starting mixture ranges from about 2 to 30 weight percent (based on 100 wt % of total starting mixture). The individual respective quantities of each of the compatibilizer compounds identified as 3a, and 4 in Table II can range as shown within such broad range. A starting mixture can optionally but preferably contain a mixture of 3, 3a and 4 compounds as above indicated.

In general, any dimethyl terephthalate residue can be used as a starting material in the practice of this invention. The term "dimethyl terephthalate residue" as used herein has reference to the purged residue which is obtained during the manufacture of dimethyl terephthalate in which p-xylene is oxidized and the crude oxidation product is then esterified with methanol to yield the desired product in a reaction mixture along with a complex mixture of by-products. Typically, the desired product (i.e., dimethyl terephthalate) is removed from the reaction mixture with the volatile methyl p-toluate by-product by distillation leaving a residue. The dimethyl terephthalate and methyl p-toluate are separated. Some of the residue is purged from the process while the remainder of the residue and the methyl p-toluate are recycled for oxidation. Thus, it is this purged residue which is employed as a starting material in the present invention for transesterification with glycols of formula (1) and nonionic surfactant.

U.S. Pat. No. 3,647,759, for example, describes such residue and characterizes its properties; the disclosure and teachings of this publication are incorporated by reference herein in their entirety.

A class of suitable aliphatic diols is shown in formula (1) (above).

Examples of suitable aliphatic diols of formula (1) include ethylene glycol, propylene glycol, dipropylene glycol, trimethylene glycol, butylene glycols, 1,2-cyclohexanediol, poly(oxyalkylene) polyols derived by the condensation of ethylene oxide, propylene oxide, or any combination thereof, and the like. As those skilled in the art will appreciate, in the preparation of mixed poly(oxyethylene-oxypropylene) polyols, the ethylene and propylene oxides may be added to a starting hydroxyl-containing reaction either in admixture or sequentially. Mixtures of such diols can be employed, if desired. A presently most preferred aliphatic diol of formula (1) is diethylene glycol.

Any hydrophobic compound as above characterized can be employed so far as now known, such as monocarboxylic acids (especially fatty acids), lower alkanol esters of monocarboxylic acids (especially fatty acid esters), triglycerides (especially fats and oils), alkyl monohydroxy alcohols (for example, those containing from 8 to 18 carbon atoms per molecule), substituted phenols (for example, alkyl phenols), and the like. Mixtures of different hydrophobic compounds can be employed if desired.

Examples of fatty acids include caproic, caprylic, capric, lauric, myristic, palmitic, stearic, oleic, linoleic, linolenic, ricinoleic, mixtures thereof, and the like.

Examples of fatty acid methyl esters include methyl caproate, methyl caprylate, methyl caprate, methyl laurate, methyl myristate, methyl palmitate, methyl oleate, methyl stearate, methyl linoleate, methyl linolenate, mixtures thereof, and the like.

Examples of alkyl alcohols include decyl, oleyl, cetyl, isodecyl, tridecyl, lauryl, mixtures thereof, and the like.

Examples of fats and oils include castor, coconut (including cochin), corn, cottonseed, linseed, olive, palm, palm kernel, peanut, safflower, soybean, sunflower, tall oil, tallow, mixtures thereof, and the like.

Other suitable acids include 2-ethyl hexanoic acid and the like.

Presently preferred types of hydrophobic compounds include alkyl alcohols, fats and oils, and the like. Examples of particular presently preferred such hydrophobic compounds include decyl alcohol, soybean oil, and the like.

Any nonionic surfactant compound as above characterized can be employed so far as is now known. In general, in the practice of the present invention, it is preferred that a nonionic surfactant contain from 4 to about 270 individual oxyalkylene groups per molecule with the oxyalkylene groups typically being selected from the group consisting of oxyethylene and oxypropylene.

The hydrophobic portion of a nonionic surfactant is preferably derived from at least one starting compound which is selected from the group consisting of:
(a) Fatty alcohols containing from about 6 to 18 carbon atoms each,
(b) Fatty amides containing from about 6 to 18 carbon atoms each,
(c) Fatty amines containing from about 6 to 18 carbon atoms each,
(d) Fatty acids containing from 6 to 18 carbon atoms each,
(e) Phenols and/or alkyl phenols wherein the alkyl group contains from about 4 to 16 carbon atoms each,
(f) Fats and oils containing from 6 to about 60 carbon atoms each,
(g) Polyoxypropylene glycols containing from 10 to 70 moles of propylene oxide, and
(h) mixtures thereof.

In making a nonionic surfactant, as is known, such a starting compound is sufficiently alkoxylated to provide a desired hydrophilic portion. Typically, alkoxylation results in chains totaling from at least about 3 to about 125 moles of alkylene oxide per molecule with the alkylene oxide preferably being selected from the group consisting of ethylene oxide, propylene oxide, and mixtures thereof.

One class of nonionic surfactants employable in the practice of this invention is characterized by the formula:

$$RO(CH_2CH_2O)_nH \qquad (3)$$

where:
R is a radical selected from the group consisting of alkyl phenyl radicals wherein the alkyl group in each such phenyl radical contains about five to eighteen carbon atoms, and alkyl radicals each containing from two through eighteen carbon atoms, and
n is a positive whole number which is sufficient to keep the molecular weight of the product surfactant below about 1500.

It is presently preferred that all nonionic surfactants employed in the practice of the present invention contain both units of ethylene oxide and units of propylene oxide. Thus, for example, the hydrophobic part of a molecule can contain mainly recurring propylene oxide units, or, in some cases, block units of largely propylene oxide, with some ethylene oxide units being present.

One preferred class of nonionic surfactants comprises at least one relatively high molecular weight propoxylate ethoxylate compound having a molecular weight ranging from about 1500 to 12,000. Preferably, such a compound contains at least one block polyoxypropylene group containing at least about 10 propoxy units and also at least one block polyoxyethylene group containing at least about 20 ethoxy units.

One presently particularly preferred class of nonionic surfactant is characterized by having:
(1) a molecular weight of at least from about 3000 to 8000,
(2) a solubility in diethylene glycol phthalate to such an extent that at least 5 parts by weight are soluble in each 100 parts by weight of a diethylene glycol phthalate (which is a stoichiometric reaction product of one mole of phthalic acid anhydride with two moles of diethylene glycol (or equivalent),
(3) at least one block polyoxypropylene group which contains from about 10 to 70 repeating propoxy units,
(4) at least one block polyoxyethylene group which contains from about 15 to 200 repeating ethoxy units, and
(5) both a hydrophobic moiety and a hydrophilic moiety.

In such a particularly preferred such nonionic surfactant as above characterized, the total alkoxyl content includes at least about 40 weight percent of ethylene oxide, and preferably the ethylene oxide content ranges from about 55 to 75 weight percent, and most preferably the ethylene oxide content ranges from about 60 to 70 weight percent. Preferably such a nonionic surfactant is end capped with at least one ethylene oxide group.

In general, a "low molecular weight nonionic surfactant compound" references herein such a compound which has a molecular weight below about 2000. Thus, a "high molecular weight nonionic surfactant" references such a compound which has a molecular weight greater than about 2000.

If desired, mixtures of high and low molecular weight nonionic surfactants can be employed.

Optionally, after its formation by a heating step as described herein, a liquid product polyester polyol blend of this invention can be admixed with, and/or have dissolved or dispersed therein, for each 100 parts by weight of such liquid polyol blend, from 0 to about 30 parts by weight of at least one such high molecular weight propoxylate ethoxylate compound. Such an admixture and dissolution is preferably carried out while maintaining a temperature ranging from about 50° to 100° C.

However, the total quantity of such high molecular weight propoxylate ethoxylate compound present in such a product polyol blend, whether such compound is present during such heating, or is subsequently admixed with such a polyol blend, as indicated, ranges from greater than 0 to about 30 weight percent on a 100 weight percent total liquid polyol blend product basis.

When such a starting mixture containing dibasic carboxylic acid compound(s) are employed, it is preferred that such mixture contain about 2 to 30 weight percent (on a 100% by weight total such mixture basis) of dibasic carboxylic acid compound(s) which can include dimer acids.

In addition to such dimethyl terephthalate residue, such aliphatic diol, such nonionic surfactant compound, such optional hydrophobic compound, and such optional dibasic acid compound, a starting mixture can also, if desired, contain minor amounts (generally less than about 10% by weight based upon total starting mixture weight) of other reactive components such as shown in Table II. For example, polyhydroxylated and/or polycarboxylated compounds, that is, compounds having at least two or more functional hydroxyl and/or carboxyl groups per molecule can be present. Such compounds can be used, if desired, to increase and to regulate viscosity of a product polyol blend. Thus, polyols (especially aliphatic polyols), polycarboxylated aromatic acid compounds, polyaromatic ester compounds, and corresponding esters, and polycarboxylated aliphatic acid compounds and corresponding esters can be employed, as shown in Table II above.

For example, such a starting mixture can optionally incorporate low molecular weight polyols (that is, compounds which preferably contain 6 or less carbon atoms per molecule, but which contain at least three or more hydroxyl groups per molecule). Examples of such polyols comprise glycerol, 1,1,1-trimethylolpropane, 1,1,1-trimethylolethane, pentaerythritol, sorbitol, mixtures thereof, and the like.

For another example, such a starting mixture can optionally incorporate aromatic polycarboxylic acid or acid anhydride compounds, or aromatic polycarboxylic esters, or mixtures thereof; that is, acids and/or esters which contain aromatic carboxylated compounds containing at least three carboxyl groups per molecule (including anhydrides) and which preferably contain less than 13 carbon atoms per molecule. Examples of such aromatic polycarboxylated acid compounds and esters comprise phthalic anhydride residues, trimellitic anhydride, trimellitic acid, mixtures thereof, and the like. Of interest in this regard are the acidic residues resulting from the manufacture of phthalic anhydride and of terephthalic acid.

For another example, such a starting mixture can optionally incorporate an aliphatic polycarboxylic acid, an acid anhydride compound, or an alkyl ester compound, or a residue from the manufacture of aliphatic polycarboxylated acids or esters, that is, aliphatic carboxylated compounds which contain at least two carboxyl groups per molecule (including anhydrides) and which preferably contain less than 9 carbon atoms per molecule. Examples of such aliphatic polycarboxylated acid compounds comprise adipic acid, glutaric acid, succinic acid, their respective alkyl esters, mixtures thereof, and the like.

Dimethyl Terephthalate Residue Based Polyester Polyol Product Blends

A liquid product blend of this invention is a reaction product of a starting mixture as above described. Preferred preparation conditions are as above described. Such a reaction product has characteristics as above indicated and as further summarized in Table III below:

TABLE III

Dimethyl Terephthalate Residue Based Polyester Polyol Blends

| Item | Characteristic or Property | Range Broad | Preferred | More Preferred |
|---|---|---|---|---|
| 1. | Hydroxyl number | 200–500 | 225–400 | 250–350 |
| 2. | Acid number | 0.10–7.0 | 0.2–5.0 | 1.0–3.0 |
| 3. | Saponification value | 130–400 | 150–350 | 250–310 |
| 4. | Viscosity (centipoises)* | 200–50,000 | 500–20,000 | 1000–5000 |

*measured with a Brookfield viscometer at 25° C.

Such a polyol blend is also a reaction product of any other minor reactive additional components present in a starting mixture, as described above. In effect, during the heating (transesterification), the dimethyl terephthalate residue becomes esterified by the hydroxyl groups of the polyhydric alcohol compounds present, thereby producing polyester polyol blends. A polyol blend reaction product is thus inherently a complex mixture of various esterified alcohols and certain other compounds. The quantity of dimethyl terephthalate residue based polyester polyol present in any given product is generally proportional to the quantity and composition of dimethyl terephthalate residue present in a starting mixture.

The fact that a polyol product of this invention is an interreacted system derived from the starting components present in a starting mixture can be demonstrated by any convenient means. When, for example, a starting mixture and a corresponding product mixture are examined by HPLC (high pressure liquid chromatography), it is found that the reaction product has a most substantially altered composition compared to that of the starting mixture.

Also, HPLC analysis shows that a polyol blend reaction product of this invention has a substantially different composition from a mixed composition which has been prepared by transesterifying a dimethyl terephthalate residue with only an aliphatic diol of formula (1).

Further, HPLC analysis of a product polyol blend appears to characteristically show peaks in the 15 to 17 minute range when using a Regis octadecylsilane column with 5 micron packing and having a length of about 25 centimeters. Such peaks appear to be absent when mere physical mixtures of nonionic surfactant compound and/or hydrophobic compound are present in a dimethyl terephthalate residue based polyester polyol blend made only with low molecular weight diol (e.g. formula (1) diol) are involved.

A post formation admixed hydrophobic compound or nonionic surfactant compound is characteristically soluble in a dimethyl terephthalate residue based polyester polyol blend of this invention. In contrast, if, for example, a hydrophobic compound is admixed with a prior art dimethyl terephthalate residue based polyester polyol then a two-phased mixture results.

It is a feature of the present invention that one can admix with, and dissolve in, a product polyol blend as characterized in Table III above additional quantities of compatibilizer compound. Thus, for example, for each 70 parts by weight of such product blend, from 0 to about 30 parts by weight of at least one nonionic surfactant compound is admixable with and dissolved therein provided that the total quantity of nonionic surfactant compound (both reacted and admixed) ranges from greater than 0 to about 30 parts by weight from each 100 parts by weight of such product blend. Preferably, the admixed nonionic surfactant compound is a nonionic propoxylate ethoxylate compound. Such a resulting mixture generally retains the characteristics shown in Table III.

Furthermore, in the case of the class of preferred liquid reaction products of this invention which have been prepared from a starting mixture that has had incorporated thereinto a high molecular weight nonionic propoxylate ethoxylate compound, it is found by HPLC analysis that such products display a characteristically different composition from that shown by, for example, a diethylene glycol transesterified dimethyl terephthalate residue polyol to which has been added after formation such a low or high molecular weight nonionic surfactant compound.

Product polyols produced by incorporating into a starting mixture a residue from the manufacture of phthalic anhydride or a residue from the manufacture of dimethyl terephthalate tend to have a black color which can characteristically be very dense. It is presently difficult if not impossible to measure accurately by known direct techniques the fluorocarbon solubility capability or characteristics of such a black liquid product polyol. For present purposes generally, fluorocarbon solubility is conveniently directly measured or defined as the maximum amount of trichlorofluoromethane (known commercially as Freon 11, available from the duPont Company) which can be dissolved in a polyol blend. However, the dark or black colored product polyols do produce improved cellular polymers when catalytically reacted with isocyanates, as taught herein, and such polymers apparently have excellent physical characteristics, such as tumble friability, burn char, and the like.

Resin Prepolymer Blends

Resin prepolymer blends of this invention can be easily and conveniently prepared from product polyol blends of this invention by admixing therewith a urethane-forming, an isocyanurate-forming, and/or mixed polyurethane/polyisocyanurate forming catalyst or catalyst system. In addition, a fluorocarbon blowing agent is mixed therewith (dissolved therein).

Many different types of resin prepolymer blends using polyols of this invention can be prepared using the additives, polyols, and know-how familiar to those skilled in the art. The polyols of this invention appear to be readily blendable with such materials.

One presently preferred and illustrative class of prepolymer resin blend formulations which incorporate polyol blends of this invention and which class is now believed to be particularly suitable for making polyisocyanurate rigid foams is characterizable as shown in the following Table IV:

TABLE IV

Preferred Resin Precursor Blends For Polyurethane-Polyisocyanurate Foams
(100 weight percent basis)

| Item No. | Component | wt. % Preferred range | wt. % More Preferred Range |
|---|---|---|---|
| (A) | polyol blend | 20–65 | 40–60 |
| (B) | trimerization catalyst | 1.0–7.0 | 1.5–5.0 |
| (C) | cell stabilizing surfactant | 0–5.0 | 1.0–2.0 |
| (D) | fluorocarbon blowing agent | 20–60 | 25–40 |
| (E) | low molecular wt. nonionic surfactant compounds* | 0–20 | 0–10 |
| (F) | high molecular wt. nonionic surfactants* | 0–20 | 0–10 |
| (G) | other additives | 0–15 | 0–10 |

*admixed after polyol blend formation

One presently preferred and illustrative class of prepolymer resin blend formulations which incorporate polyol blends of this invention and which class is now believed to be particularly suitable for making polyurethane rigid foams is characterizable as shown in the following Table V.

TABLE V

Preferred Resin Precursor Blends For Polyurethane Foams
(100 weight percent basis)

| Item No. | Component | wt. % Preferred range | wt. % More Preferred Range |
|---|---|---|---|
| (A) | polyol blend | 20–65 | 40–60 |
| (B) | urethane forming catalyst | 0.5–10.0 | 1.0–4.0 |
| (C) | cell stabilizing surfactant | 0.5–3.0 | 1.0–2.0 |
| (D) | fluorocarbon blowing agent | 0–30 | 5–20 |
| (E) | water | 0–20.0 | 0–2 |
| (F) | low molecular wt. nonionic surfactants* | 0–10 | 0–5 |
| (G) | high molecular wt. nonionic surfactants* | 0–10 | 0–5 |

*admixed after polyol blend formation

Preferably, the viscosity of such a B-side resin prepolymer blend formulation of Table IV or V ranges from about 100 to 2000 centipoises at 25° C. (measured, for example, with a Brookfield viscometer) and the hydroxyl number thereof falls in the range from about 40–300.

EMBODIMENTS

The present invention is further illustrated by reference to the following examples. Those skilled in the art will appreciate that other and further embodiments are obvious and within the spirit and scope of this invention from the teachings of these present examples taken with the accompanying specification. Unless otherwise indicated all product polyol blends of this invention hereinbelow described have a saponification number of from about 130 to 400.

STARTING MATERIALS

EXAMPLE A

A dimethyl terephthalate residue based polyester polyol for testing and comparison purposes is prepared as follows:

To a 3 liter, four-neck, round-bottom flask equipped with a stirrer, thermometer, nitrogen inlet tube, and a distilling head consisting of a straight adapter with a sealed-on Liebig condenser there is added 789.6 grams (7.45 moles) of diethylene glycol and 1396.6 grams of dimethyl terephthalate residue (obtained from Hercules Incorporated). The mixture is heated to 220° C. with stirring and kept at this temperature until the rate of methanol being removed slowed down.

Stannous octoate (200 ppm) is then added to the mixture and the heating continued until the acid number reaches about 2.8. The reaction mixture is then cooled to room temperature and analyzed. The hydroxyl number is found to be about 257 and the acid number about 2.8.

This product is a dark colored liquid which has a hydroxyl number of about 257 and has a viscosity of greater than about 2,000,000 centipoises at 25° C. measured with a Brookfield viscometer.

EXAMPLE B

A specimen of a phthalic anhydride bottoms-composition is obtained from Stepan Company having:
(a) a phthalic anhydride content of about 60 weight percent (total composition basis),
(b) a hydroxyl number estimated to be about 0, and
(c) an acid number estimated to be about 700.

The phthalic anhydride bottoms used as a starting material in the practice of the present invention results from the process of converting o-xylene to phthalic anhydride.

Distillation of the reaction product known as "crude" or "PA crude" results in a first distillate known as "light ends" or "phthalic anhydride light ends", a second distillate comprising substantially pure phthalic anhydride and a residue known as bottoms or phthalic anhydride bottoms. The crude, the light ends and the bottoms can each be regarded as having a somewhat variable composition, such compositional variations being the result of variations in the starting o-xylene feed, and also of variations in the exact conditions employed for the respective process steps.

In actual commercial practice, it is believed that, in a bottoms composition, the quantity of phthalic anhydride present can range from a low of about 10 weight percent to a high of about 99 weight percent on a 100 weight percent total bottoms basis, with the balance up to 100 weight percent thereof in any given bottoms compositions being mainly trimellitic acid and/or trimellitic acid anhydride plus insolubles.

EXAMPLE C ("Terate 131"), brand of dimethyl terephthalate residue comprising a mixture of methyl and benzyl esters of benzene and biphenyl di- and tricarboxylic acids obtained commercially from Hercules Incorporated. See Table A.

EXAMPLE D

An esterified dibasic acid is obtained from Dupont under the trade description "DBE-2". This material is manufactured from a mixed acid co-product stream typically composed of 20–35% dimethyl adipate, 65–80% dimethyl glutarate, and 0–3% dimethyl succinate. This material has the following characteristics:

| Molecular weight: | about 163 |
| Acid number: | 1 max |
| Ester Content; wt % | 99.5 min. |

EXAMPLE E

A 17006 pound batch of presently preferred nonionic block propoxylate ethoxylate of nonyl phenol is produced by first charging 3,900 lbs. of appropriate nonyl phenol feed stock to an appropriate alkoxylation reactor of the proper size. This material is then heated to 110° C. and an appropriate amount of potassium hydroxide catalyst is added. After the addition of the catalyst, 4106 pounds of propylene oxide (about 35 moles of addition) is added slowly. Care should be taken to maintain a reaction temperature of between 110° C. to 160° C. during the addition of the propylene oxide. After this addition, the reactor is brought to approximately 110° C. and about 9000 pounds of ethylene oxide (about 65 moles of addition) are added to the reactor very slowly. This is a very exothermic reaction and care should be taken to maintain a reaction temperature of between about 110° to 160° C. The ethoxylation is terminated when the appropriate degree of ethoxylation is achieved; this should occur after approximately all of the 9000 pounds of ethylene oxide are added to the reactor. Proper agitation in the alkoxylation should be maintained during both ethylene oxide and propylene oxide additions. The product contains about 65 moles of condensed ethylene oxide in block form and about 35 moles of condensed propylene oxide in block form.

The product has the following characteristics:

| Molecular weight | about 4800 |
| Hydroxyl number | about 12 |
| Functionality: | about 1 |
| Physical state: | solid at 25° C. |

EXAMPLE F

An organic polyisocyanate trimerization catalyst is obtained under the trade designation "Hex-Chem 977" from the Mooney Chemical Company. This catalyst is believed to comprise potassium octoate in glycol solution.

EXAMPLE G

A silicone cell stabilizing surfactant is obtained under the trade designation "DC-193" from Dow Corning Company. This surfactant is believed to be comprised of a polyalkylene oxide silicone.

EXAMPLE H

A trimerization catalyst is obtained under the tradename "TMR-30" from Air Products Company. The catalyst is believed to be an ammonium compound of an organic base.

EXAMPLE I (PAPI-27) An organic polyisocyanate believed to comprise polymethylene polyphenyl polyisocyanate obtained commercially from Dow Chemical Company.

EXAMPLE J (Freon 11) Trichlorofluoromethane obtained commercially from E. I. duPont de Nemours and Co., Wilmington, Delaware.

EXAMPLE K ("Makon 6"), Ethoxylated nonyphenol available commercially from Stepan Company. See Table B.

EXAMPLE L ("Sylfat 96"), Tall oil fatty acids, available commercially from Union Camp Corporation.

TABLE A

Typical Values for "Terate 131"

| Property | Terate 131 |
|---|---|
| Softening point, °C. | 80–100 |
| Acid number | 70–90 |
| Viscosity at 100° C., cps | 7,000 |
| Saponification number (drastic) | 430 |
| Ash, % | 0.3 |
| Flashpoint (Cleveland open cup), °C. | 200° C. |
| Specific gravity at 120° C. | 1.22 |
| Methoxyl content, % | 9 |
| Color | dark brown |
| Average Composition | |
| DMT, % | 1 |
| Substituted benzenes, % | 1 |
| Polycarbomethoxy diphenyls, % | 10 |
| Benzyl esters of toluate family, % | 4 |
| Dicarbomethoxy fluorenone, % | 1 |
| Carbomethoxy benzocoumarins, % | 0.1 |
| Carbomethoxy polyphenyls, % | 45 |
| Molecular weight average | 600 |
| Average Functionality | 2.5 |

TABLE B

Typical Properties of "Makon 6"

| Physical Appearance | Lt. Straw Liquid |
|---|---|
| Solidification Point, °C. | −34 |
| Pour Point, °C. | −29 |
| Color, APHA | 100 |
| Hydroxyl Number | 115–118 |
| Approximate HLB | 11 |
| Moles of EO, Average | 6 |
| pH (5% in 50:50 IPA-Water) | 7.0–8.5 |
| Density, lbs/gal @ 25° C. | 8.7 |

EXAMPLES

Example 1

Preparation Of A Polyol Blend From Decyl Alcohol, Diethylene Glycol, and Dimethyl Terephthalate Residue To a three liter, four-neck, round-bottom flask equipped with stirrer, thermometer, Barrett distilling receiver, condenser, and nitrogen inlet tube there is charged 609.1 grams of diethylene glycol, 400.0 grams of decyl alcohol and 1143.4 grams of dimethyl terephthalate residue.

This mixture is heated to 225° C. with constant agitation and with a constant nitrogen sparge. Theoretically, about 152.5 grams of methanol forms and substantially all of such formed material is taken off at the distilling receiver. After this distillate material is collected, 200 ppm of stannous octoate is added to the flask as a transesterification catalyst. Additional material removed from the distilling receiver is replaced by an equal weight of diethylene glycol. The heating is continued until the acid value of the product liquid is less than about 4.0. This reaction (heating) is stopped at an acid value of about 3.6. The product polyol has a hydroxyl number of about 253.6, a viscosity of about 27,450 cps at 25° C., and contains about 0.14 water.

Example 2

Preparation Of A Polyol Blend From Decyl Alcohol, Example K Material, Diethylene Glycol and Dimethyl Terephthalate Residue To a three liter, four-neck, round-bottom flask equipped with stirrer, thermometer, Barrett distilling receiver, condenser, and nitrogen inlet tube there is charged 378.0 grams of decyl alcohol, 590.7 grams of diethylene glycol, 210.0 grams of Example K material (Makon 6) and 1063.0 grams of dimethyl terephthalate residue. This mixture is heated to 225° C. with constant agitation and with a constant nitrogen sparge. After approximately 95% of the theoretical methanol has been removed, 200 ppm of stannous octoate is added to the flask. Any additional material taken from the distilling receiver is replaced by an equal weight of diethylene glycol. The reaction is carried out until the acid value is about 2.1 and the hydroxyl number is about 255.6. The viscosity is found to be about 15,430 cps at 25° C. measured using a Brookfield viscometer (model LVT).

Example 3

Preparation Of A Polyol Blend From Decyl Aclohol, Example E Material, Diethylene Glycol, and Dimethyl Terephthalate Residue To a three liter, four-neck, round-bottom flask equipped with stirrer, thermometer, Barrett distilling receiver, condenser, and nitrogen inlet tube there is charged 200.0 grams of Example E material, 548.2 grams of diethylene glycol, 360.0 grams of decyl alcohol and 1029.1 grams of dimethyl terephthalate residue.

This mixture is heated to 225° C. with constant agitation and with a constant nitrogen sparge. Theoretically, 137.2 grams of methanol forms and substantially all of such formed material is taken off at the distilling receiver. After this distillate material is collected, 200 ppm of stannous octoate is added to the flask as a transesterification catalyst. Additional material removed from the distilling receiver is replaced by an equal weight of diethylene glycol. The heating is continued until the acid value of the product liquid is less than about 4.0. This reaction (heating) is stopped at an acid value of about 3.2. The product polyol has a hydroxyl number of about 229.7, a viscosity of about 17,220 cps at 25° C., and contains about 0.13% water.

Example 4

Preparation Of A Polyol Blend Of Decyl Alcohol, Example E Material, Example D Material, Diethylene Glycol and Dimethyl Terephthalate Residue To a three liter, four-neck, round-bottom flask equipped with stirrer, thermometer, Barrett distilling receiver, condenser, and nitrogen inlet tube, there is charged 500.0 grams of Example D material (DBE-2) 827.9 grams of diethylene glycol, 391.2 grams of decyl alcohol, 217.3 grams of Example E material and 500 grams of dimethyl terephthalate residue. This mixture is heated to 225° C. with constant agitation and with a constant nitrogen sparge. Theoretically, 263 grams of methanol forms and substantially all of such formed material is taken off at the distilling receiver. After this material is collected, 200 ppm of stannous octoate is added to the flask as a transesterification catalyst. Additional material removed from the distilling receiver is replaced by an equal weight of diethylene glycol. The heating is carried out until the acid value of the product liquid polyol reaches about 3.0. The product polyol has a hydroxyl number of about 256.6, a viscosity of about 8320 cps at 25° C. and contains about 0.16% water.

Example 5

Preparation Of A Decyl Alcohol, Example E Material, Phthalic Anhydride, Diethylene Glycol, and Dimethyl Terephthalate Residue To a three liter, four-neck, round-bottom flask equipped with stirrer, thermometer, Barrett distilling receiver, condenser, and nitrogen inlet tube, there is charged 450.0 grams of phthalic anhydride, 825.6 grams of diethylene glycol, 402.7 grams of decyl alcohol, 223.7 grams of Example E material and 450 grams of dimethyl terephthalate residue. This mixture is heated to 225° C. with constant agitation and with a constant nitrogen sparge. Theoretically, 54.7 grams of water and 60 grams of methanol (total 114.7 grams of material) forms and substantially all of such formed material is taken off at the distilling receiver. After this material is collected, 200 ppm of stannous octoate is added to the flask as a transesterification/esterification catalyst. Additional material removed from the distilling receiver is replaced by an equal weight of diethylene glycol. The heating is carried out until the acid value of the product liquid polyol reaches about 2.9. The product polyol has a hydroxyl number of about 252.9, a viscosity of about 10,120 cps at 25° C., and contains about 0.13% water.

Example 6

Preparation Of A Polyol Blend From Example L Material, Diethylene Glycol and Dimethyl Terephthalate Residue To a three liter, four-neck, round-bottom flask equipped with stirrer, thermometer, Barrett distilling receiver, condenser, and nitrogen inlet tube there is charged 850.9 grams of diethylene glycol, 439.9 grams of Example L material (Tall Oil) and 1081.2 grams of dimethyl terephthalate residue. This mixture is heated to 225° C. with constant agitation and with a constant nitrogen sparge. After approximately 95% of the theoretical methanol has been removed, 200 ppm of stannous octoate is added to the flask. Any additional material taken from the distilling receiver is replaced by an equal weight of diethylene glycol. The reaction is carried out until the acid value is about 4.0 and the hydroxyl number is about 257.2. The viscosity is found to be about 15,500 cps at 25° C. measured using a Brookfield viscometer (model LVT).

Example 7

Preparation Of A Polyol Blend Of Tall Oil Example E Material, Diethylene Glycol and Dimethyl Terephthalate Residue To a three liter, four-neck, round-bottom flask equipped with stirrer, thermometer, Barrett distilling receiver, condenser, and nitrogen inlet tube, there is charged 765.8 grams of diethylene glycol, 395.9 grams of Example L (Tall Oil), 220.0 grams of Example E material and 973.1 grams of dimethyl terephthalate residue. This mixture is heated to 225° C. with constant agitation and with a constant nitrogen sparge. Theoretically, 129.8 grams of methanol and 25.1 grams of water (Total 154.9 grams of material) forms and substantially all of such formed material is taken off at the distilling receiver. After this material is collected, 200 ppm of stannous octoate is added to the flask as a transesterification catalyst. Additional material removed from the distilling receiver is replaced by an equal weight of diethylene glycol. The heating is carried out until the acid value of the product liquid polyol reaches about 3.6. The product polyol has a hydroxyl number of about 232.6, a viscosity of about 10,800 cps at 25° C. and contains about 0.24 water.

Example 8

Preparation Of A Decyl Alcohol, Example E Material, Example B Material, Diethylene Glycol and Dimethyl Terephthalate Residue To a three liter, four-neck, round-bottom flask equipped with stirrer, thermometer, Barrett distilling receiver, condenser, and nitrogen inlet tube, there is charged 450.0 grams of Example B material, 825.6 grams of diethylene glycol, 402.7 grams of decyl alcohol, 223.7 grams of Example E material and 450.0 grams of dimethyl terephthalate residue. This mixture is heated to 225° C. with constant agitation and with a constant nitrogen sparge. Theoretically, 54.7 grams of water and 60 grams of methanol (Total 114.7 grams of material) forms and substantially all of such formed material is taken off at the distilling receiver. After this material is collected, 200 ppm of stannous octoate is added to the flask as a transesterification/esterification catalyst. Additional material removed from the distilling receiver is replaced by an equal weight of diethylene glycol. The heating is carried out until the acid value of the product liquid polyol reaches about 3.0. The product polyol has a hydroxyl number of about 256.3, a viscosity of about 19,500 cps at 25° C. and contains about 0.09% water.

Example 9

Resin Prepolymer

Each of the polyols of Example 1–8 is mixed (blended with) a urethane/isocyanurate forming catalyst and with a cell stabilizing surfactant to form a resin prepolymer blend suitable for reacting with organic isocyanate to form a cellular polymer. Each such resin prepolymer blend has the following composition:

TABLE VI

Resin Prepolymer Composition
(100 wt. % total weight basis)

| Component | weight percent |
|---|---|
| polyol | 94 |
| potassium octoate[1] | 4 |
| silicone surfactant[2] | 2 |

Table VII footnotes
[1]Example "F"
[2]Example "G"

Examples 1–8 Tumble Friability

To illustrate tumble friability for polyurethane-polyisocyanurate foam prepared from self-compatibilized polyols of this invention, polyol blends were prepared as shown in Table VII below and these blends were then converted to cellular foams using a procedure similar to that of Example 9. The foams are then evaluated for tumble friability according to ASTM procedure C421-77. The date obtained are given in Table VII below and such data show that the tumble friabilities of the foam prepared using polyols of the prior art have tumble friabilities that are about 20% higher (Examples 1 and 6) than those found for foam prepared from polyols of this invention (Examples 2, 3, 4, 5, 7, and 8).

We claim:

1. A process for preparing a low acid number self-compatabilizing polyester polyol product blend based on a dimethyl terephthalate residue comprising the step of heating at a temperature ranging from about 180° to 240° C. a starting mixture which comprises on a 100 weight percent total basis:

(A) from about 15 to 80 weight percent of dimethyl terephthalate residue;

(B) from about 8 to 80 weight percent of at least one low molecular weight aliphatic diol characterized by the generic formula:

$$HO-R^1-OH$$

where: $R^1$ is a divalent radical selected from the group consisting of:
(a) alkylene radicals each containing from 2 through 6 carbon atoms,
(b) radicals of the formula:

$$-(R^3O)_n-R^3-$$

where:
$R^3$ is an alkylene radical containing from 2 through 3 carbon atoms, and n is an integer of from 1 through 3, and
(c) mixtures thereof,

TABLE VII

Tumble Friabilities Of Polyurethane-Polyisocyanurate Foams Prepared From Self-Compatibilized Dimethyl Terephthalate Residue Based Polyester Polyols

| | Example | | | | | | | |
|---|---|---|---|---|---|---|---|---|
| | 1 | 2 | 3 | 4 | 5 | 6 | 7 | 8 |
| Components, weight in grams | | | | | | | | |
| Dimethyl terephthalate residue (Example C material) | 1143.4 | 1063.0 | 1029.1 | 500 | 450.0 | 1081.2 | 973.1 | 450.0 |
| phthalic anhydride | — | — | — | — | 450.0 | — | — | — |
| phthalic anhydride bottoms, | | | | | | | | |
| (Example B material) | — | — | — | — | — | — | — | 450.0 |
| (Example K material) | — | 210.0 | — | — | — | — | — | — |
| Diethylene glycol | 609.1 | 590.7 | 548.2 | 827.9 | 825.6 | 850.9 | 765.8 | 825.6 |
| Decyl alcohol | 400 | 378.0 | 360.0 | 391.2 | 402.7 | — | — | 402.7 |
| PO—EO blocked polymer, | | | | | | | | |
| (Example E material) | — | — | 200.0 | 217.3 | 223.7 | — | 220.0 | 223.7 |
| (Example D material) | — | — | — | 500.0 | — | — | — | — |
| (Example L material) | — | — | — | — | — | 439.9 | 395.9 | — |
| Characteristics | | | | | | | | |
| Acid number | 3.6 | 2.1 | 3.2 | 3.0 | 2.9 | 4.0 | 3.6 | 3.0 |
| Hydroxyl number | 253.6 | 255.6 | 229.7 | 256.5 | 252.9 | 257.2 | 232.6 | 256.3 |
| Viscosity, centipoises at 25° C. | 27450 | 15430 | 17220 | 8320 | 10120 | 15500 | 10800 | 19500 |
| Foam Formulation | | | | | | | | |
| polyol, grams | 100.0 | 100.0 | 100.0 | 100.0 | 100.0 | 100.0 | 100.0 | 100.0 |
| DC-193, grams | 1.0 | 1.0 | 1.0 | 1.0 | 1.0 | 1.0 | 1.0 | 1.0 |
| Hex-cem 977, grams | 5.1 | 3.6 | 3.5 | 2.5 | 3.0 | 5.1 | 3.5 | 3.6 |
| TMR-30, grams | 1.0 | 0.7 | 0.7 | 0.5 | 0.6 | 1.0 | 0.7 | 0.7 |
| Freon 11, grams | 58.0 | 51.0 | 50.5 | 54.0 | 52.0 | 56.5 | 50.5 | 52.0 |
| PAPI-27, grams | 197.1 | 195.1 | 174.9 | 192.8 | 191.8 | 202.5 | 179.8 | 196.2 |
| Foam Properties | | | | | | | | |
| Density, PCF | 1.72 | 1.72 | 1.73 | 1.74 | 1.72 | 1.76 | 1.75 | 1.74 |
| Tumble friability, % (ASTM C421-77) | 41.90 | 33.98 | 33.03 | 31.21 | 31.84 | 51.12 | 42.54 | 31.76 |

As is apparent from the foregoing specification, the invention is susceptible of being embodied with various alterations and modifications which may differ particularly from those that have been described in the preceeding specification and description. It should be understood that we wish to embody within the scope of the patent warranted hereon all such modifications as reasonably and properly come within the scope of our contribution to the art.

(C) from about 2 to 30 weight percent of at least one nonionic surfactant compound, (D) from and including 0 to about 20 weight percent of at least one hydrophobic compound selected from the group consisting of monocarboxylic acids, lower alkanol esters of monocarboxylic acids, triglycerides, alkyl monohydroxy alcohols, substituted phenols, and mixtures thereof provided that the sum total of both said nonionic surfactant compound and said hydrophobic compound is not greater than about 30 weight percent.

said hydrophobic compound being characterized by:
(1) having an equivalent weight of from about 130 to 900,
(2) containing from about 8 to 60 carbon atoms per molecule, and
(3) containing one radical per molecule, selected from the group consisting of carboxyl and hydroxyl, said nonionic surfactant compound being characterized by:
(1) containing from about 10 to 600 carbon atoms per molecule,
(2) containing at least one and not more than four hydroxyl radicals per molecule, and
(3) containing from about 4 to 270 radicals per molecule of the formula $$-(R^3O)-$$

where: $R^3$ is as above defined, said heating being continued until a liquid reaction product is produced which is characterized by having:
(A) an hydroxyl number ranging from about 200 to 500,
(B) an acid number ranging from about 0.1 to 7,
(C) a saponification value ranging from about 130 to 400, and
(D) a viscosity ranging from about 200 to 50,000 centipoises at 25° C. measured using a Brookfield viscometer.

2. The process of claim 1 wherein said starting mixture contains from about 2 to 20 weight percent of at least one said hydrophobic compound.

3. The process of claim 2 wherein the weight ratio of said nonionic surfactant compound to said hydrophobic compound ranges from about 0.1 to 10.

4. The process of claim 1 wherein said nonionic surfactant compound comprises at least one nonionic propoxylate ethoxylate compound having a molecular weight of from about 1,200 to 13,000.

5. The process of claim 4 wherein said propoxylate ethoxylate compound is characterized by having:
(1) a molecular weight of at least from about 3000 to 8000,
(2) a solubility in diethylene glycol phthalate to such an extent that at least 5 parts by weight are soluble in each 100 parts by weight of a diethylene glycol phthalate which is a stoichiometric reaction product of one mole of phthalic acid anhydride with two moles of diethylene glycol,
(3) at least one block polyoxypropylene group which contains from about 10 to 70 repeating propoxy units, and
(4) at least one block polyoxyethylene group which contains from about 15 to 200 repeating ethoxy units, provided that the total alkoxyl content includes at least about 40 weight percent of ethylene oxide.

6. The process of claim 1 wherein, after said heating, for each 70 parts by weight of such reaction product, from 0 to about 30 parts by weight of at least one said monionic surfactant compund is admixed therewith provided that the total quantity of said nonionic surfactant compound present in said product blend ranges from greater than 0 to about 30 parts by weight for each 100 parts by weight of total product blend.

7. The process of claim 1 wherein said starting mixture includes additonally from greater than 0 to about 60 weight percent on a total starting mixture basis of at least one compound containing two carboxylic functional groups and wherein:
(1) said compound contains from 2 to about 35 carbon atoms per molecule, and
(2) said functional groups are selected from the class consisting of carboxylic acids, carboxylic acid anhydrides, carboxylic acid esters, and mixtures thereof.

8. The process of claim 7 wherein said nonionic surfactant compound comprises at least one nonionic propoxylate ethoxylate compound having a molecular weight from about 1,200 to 13,000.

9. The process of claim 8 wherein said propoxylate ethoxylate compound is characterized by having:
(1) a molecular weight of at least from about 3000 to 8000,
(2) a solubility in diethylene glycol phthalate to such an extent that at least 5 parts by weight are soluble in each 100 parts by weight of a diethylene glycol phthalate which is a stoichiometric reaction product of one mole of phthalic acid anhydride with two moles of diethylene glycol,
(3) at least one block polyoxypropylene group which contains from about 10 to 70 repeating propoxy units, and
(4) at least one block polyoxyethylene group which contains from about 15 to 200 repeating ethoxy units, provided that the total alkoxyl content includes at least about 40 weight percent of ethylene oxide.

10. The process of claim 7 wherein, after said heating, for each 70 parts by weight of such reaction product, from greater than 0 to about 30 parts by weight of at least one said nonionic surfactant compound is admixed therewith provided that the total quantity of said nonionic surfactant compound present in said product blend ranges from greater than 0 to about 30 parts by weight for each 100 parts by weight of total product 11. The process of claim 1 wherein during said heating said starting mixture further contains on such 100 weight percent total starting mixture basis from greater than 0 to about 10 weight percent of at least one further polyol selected from the group consisting of glycerol, trimethylolpropane, sorbitol, trimethylolethane, pentaerythritol, and mixtures thereof.

12. The process of claim 7 wherein said compound having two functional groups comprises an aromatic material selected from the group consisting of phthalic acid anhydride, phthalic acid, terephthalic acid, dimethyl terephthalate, isophthalic acid, and mixtures thereof.

13. The process of claim 7 wherein during said heating said starting mixture further contains, on such 100 weight percent total starting mixture basis, from greater than 0 to about 10 weight percent of at least one further polybasic carboxylic acid compound selected from the group consisting of trimellitic acid anhydride, trimellitic acid, and mixtures thereof.

14. The process of claim 7 wherein during said heating said carboxylic acid compound comprises an aliphatic material selected from the group consisting of adipic acid, glutaric acid, succinic acid, their respective alkyl esters, and mixtures thereof.

15. The process of claim 7 wherein said compound having two functional groups comprises phthalic anhydride.

16. The process of claim 1 wherein during said heating said temperature ranges from about 200 to 240° C.

17. The process of claim 7 wherein said compound having two functional groups comprises phthalic anhydride, said aliphatic diol comprises diethylene glycol, and said nonionic surfactant compound comprises a nonionic propoxylate ethoxylate compound which is characterized by having:
(1) a molecular weight of at least from about 3000 to 8000,
(2) a solubility in diethylene glycol phthalate to such an extent that at least 5 parts by weight are soluble in each 100 parts by weight of a diethylene glycol phthalate (which is a stoichiometric reaction product of one mole of phthalic acid anhydride with two moles of diethylene glycol,
(3) at least one block polyoxypropylene group which contains from about 10 to 70 repeating propoxy units,
(4) at least one block polyoxyethylene group which contains from about 15 to 200 repeating ethoxy units, and
(5) the total alkoxyl content includes at least about 40 weight percent of ethylene oxide, and said starting mixture includes from about 2 to 20 weight percent of at least one said hydrophobic compound selected from the group consisting of monohydroxyl and dihydroxyl aliphatic alcohols each containing from about 8 to 18 carbon atoms per molecule provided that the total weight percent of said hydrophobic compound plus said nonionic surfactant compound is not greater than about 30 weight percent.

18. A self-compatibilized polyester polyol product blend comprising a reaction product of a starting mixture which starting mixture comprises on a 100 weight percent total basis:
(A) from about 15 to 80 weight percent of dimethyl terephthalate residue,
(B) from about 8 to 80 weight percent of at least one low molecular weight aliphatic diol characterized by the generic formula:

HO—R$^1$—OH where: R$^1$ is a divalent radical selected from the group consisting of
(a) alkylene radicals each containing from 2 through 6 carbon atoms, and
(b) radicals of the formula:

—(R$^3$O)$_n$—R$^3$— where: R$^3$ is an alkylene radical containing from 2 through 3 carbon atoms, and n is an integer of from 1 through 3, and
(c) mixtures thereof,
(C) from about 2 to 30 weight percent of at least one nonionic surfactant compound,
(D) from and including 0 to about 20 weight percent of at least one hydrophobic compound selected from the group consisting of monocarboxylic acids, lower alkanol esters of monocarboxylic acids, triglycerides, alkyl monohydroxy alcohols, substituted phenols, and mixtures thereof provided that the sum total of both said nonionic surfactant compound and said hydrophobic compound is not greater than about 30 weight percent, said hydrophobic compound being characterized by:
(1) having an equivalent weight of from about 130 to 900,
(2) containing from about 8 to 60 carbon atoms per molecule, and
(3) containing one radical per molecule, selected from the group consisting of carboxyl and hydroxyl,
said nonionic surfactant compound being characterized by:
(1) containing from about 10 to 600 carbon atoms per molecule,
(2) containing at least one and not more than four hydroxyl radicals per molecule, and
(3) containing from about 4 to 270 radicals per molecule of the formula

—(R$^3$O)— where: R$^3$ is as above defined
said reaction product being a liquid which is characterized by having:
(i) an hydroxyl number ranging from about 200 to 500,
(ii) an acid number ranging from about 0.10 to 7.0,
(iii) a saponification value ranging from about 130 to 400, and
(iv) a viscosity ranging from about 200 to 50,000 centipoises measured at 25° C. using a Brookfield viscometer.

19. The product blend of claim 18 wherein said starting mixture contains from about 2 to 20 weight percent of at least one said hydrophobic compound, provided that the total weight percent of said hydrophobic compound plus said nonionic surfactant compound is not greater than about 30 weight percent.

20. The product blend of claim 19 wherein said starting mixture includes from greater than 0 to about 60 weight percent on a total starting mixture basis of at least one dibasic carboxylic acid compound, such a carboxylic acid compound being characterized by:
(1) containing from 2 to about 35 carbon atoms per molecule,
(2) containing two carboxyl groups per molecule, and
(3) containing at least one and no more than two functional groups consisting of a carboxylic acid, a carboxylic anhydride, a carboxylic ester, a hydroxyl containing compound, or a mixture thereof.

21. The product blend of claim 20 wherein the weight ratio of said hydrophobic compound to said nonionic surfactant compound is in the range from about 0.1 to 10.

22. The product blend of claim 20 wherein said nonionic surfactant compound comprises at least one nonionic propoxylate ethoxylate compound having a molecular weight of from about 1,200 to 13,000.

23. The product blend of claim 22 wherein said nonionic propoxylate ethoxylate compound is characterized by having:
(1) a molecular weight of at least from about 3000 to 8000,
(2) a solubility in diethylene glycol phthalate to such an extent that at least 5 parts by weight are soluble in each 100 parts by weight of a diethylene glycol phthalate which is a stoichiometric reaction product of one mole of phthalic acid anhydride with two moles of diethylene glycol or (3) at least one block polyoxypropylene group which contains from about 10 to 70 repeating propoxy units, and (4) at least one block polyoxyethylene group which contains from about 15 to 200 repeating ethoxy units, provided that the total alkoxyl content includes at least about 40 weight percent of ethylene oxide.

24. The product blend of claim 20 wherein for each 70 parts by weight of said reaction product there is additionally added from 0 to about 30 parts by weight of at least one said nonionic surfactant compound provided that the total quantity of said nonionic surfactant compound present in each product blend ranges from greater than 0 to about 30 parts by weight for each 100 parts of said product blend.

25. The product blend of claim 20 wherein said dibasic carboxylic acid compound comprises a material selected from the group consisting of phthalic acid, phthalic anhydride, terephthalic acid, dimethyl terephthalate, and isophthalic acid.

26. The product blend of claim 24 wherein said starting mixture further contains at least one nonionic propoxylate ethoxylate compound having a molecular weight of from about 1200 to 13,000.

27. The product blend of claim 26 wherein said dibasic carboxylic acidic compound comprises phthalic anhydride, said aliphatic diol comprises diethylene glycol, said hydrophobic compound comprises decyl alcohol, and said nonionic surfactant compound comprises a nonionic propoxylate ethoxylate compound is characterized by having:

(1) a molecular weight of at least from about 3000 to 8000, (2) a solubility in diethylene glycol phthalate to such an extent that at least 5 parts by weight are soluble in each 100 parts by weight of a diethylene glycol phthalate which is a stoichiometric reaction product of one mole of phthalic acid anhydride with two moles of diethylene glycol, (3) at least one block polyoxypropylene group which contains from about 10 to 70 repeating propoxy units, (4) at least one block polyoxyethylene group which contains from about 15 to 200 repeating ethoxy units, and (5) the total alkoxyl content includes at least about 40 weight percent of ethylene oxide.

28. The product blend of claim 20 wherein said propoxylate ethoxylate compound is further characterized by having an ethylene oxide content which ranges from about 55 to 75 weight percent based on total alkoxyl content.

29. The product blend of claim 28 wherein said propoxylate ethoxylate compound is further characterized by having an ethylene oxide content which ranges from about 60 to 70 weight percent based on total alkoxyl content.

* * * * *